United States Patent

Drexler et al.

[15] 3,702,965

[45] Nov. 14, 1972

[54] INTERNAL STATIC EXCITATION SYSTEM FOR A DYNAMOELECTRIC MACHINE

[72] Inventors: Karl F. Drexler, Burnt Hills; Henry W. Kudlacik, Schenectady, both of N.Y.

[73] Assignee: General Electric Company

[22] Filed: June 22, 1971

[21] Appl. No.: 155,511

[52] U.S. Cl. ............... 322/25, 310/68 R, 310/68 D, 310/162, 310/165, 322/59, 322/90, 322/93
[51] Int. Cl. ....................... H02p/9/00; H02p 11/00
[58] Field of Search .................... 310/68 R, 68 E, 310/162, 105; 322/25, 59, 75, 90, 58, 93

[56] References Cited

UNITED STATES PATENTS

| | | | |
|---|---|---|---|
| 2,569,302 | 9/1951 | Forssell | 322/25 |
| 2,768,344 | 10/1956 | McKenna | 322/25 |

*Primary Examiner*—J. D. Miller
*Assistant Examiner*—Mark O. Budd
*Attorney*—William C. Crutcher et al.

[57] ABSTRACT

A static excitation system is provided for self-excitation of a large generator with gas and/or liquid cooling systems which is located inside or closely coupled to the generator casing so as to utilize the generator coolant system. The static excitation transformer has one primary winding connected to a supplementary winding in selected dynamoelectric machine slots responsive to the generator field synchronous flux and another primary winding comprised of the neutral leads of the generator main winding responsive to generator current. The secondary of the internal excitation transformer thus provides a compound voltage source, responsive to both generator field flux and generator current which is then rectified and applied through suitable controls to the generator field.

7 Claims, 9 Drawing Figures

INVENTORS:
KARL F. DREXLER
HENRY W. KUDLACIK
BY W. C. Crutcher
THEIR ATTORNEY.

INVENTORS:
KARL F. DREXLER
HENRY W. KUDLACIK
BY W. C. Crutcher
THEIR ATTORNEY

INTERNAL STATIC EXCITATION SYSTEM FOR A DYNAMOELECTRIC MACHINE

BACKGROUND OF THE INVENTION

This invention relates generally to static excitation systems for large gas or liquid cooled dynamoelectric machines, and more particularly to self-excited dynamoelectric machines using excitation transformers to produce a compounded excitation power source for the field windings.

Excitation systems for very large dynamoelectric machines such as turbine-generators have grown in complexity and rating along with the ratings of the generators themselves. Early excitation systems included rotating power sources such as a separate DC generator driven by the turbine generator shaft which supplied field excitation through slip rings and brushes to the rotating field winding. Another arrangement in which the excitation power source is rotating employs an AC exciter driven by the turbine-generator with rectification and control of the excitation voltage in external stationary rectifier banks.

Another variation wherein components of the excitation source are rotating, is the rotating rectifier system, where an AC exciter driven by the turbine-generator supplies current to the field windings through rectifiers which are carried on the rotating shaft.

A separate broad category of excitation systems, and one to which the present invention pertains, is the "-static" system where the excitation power source, the rectifiers and the voltage regulator components are non-rotating. Static excitation power sources have been proposed which supply field excitation to a generator by taking excitation power from the stator output buses by means of an external "excitation transformer" with "potential" and "current" windings coupled with the generator lines. Although such systems, sometimes controlled by a "saturating" DC control winding on the excitation transformer, provide an excellent self-regulating power source, these systems tend to be large and expensive, complicate the power plant layout, require separate cooling systems, and require undesirable connections into or between the isolated phase buses between the generator and the main power transformer.

Very rapid response and a largely self-regulating excitation action can be obtained in a static system by "-compounding" the excitation windings, so that the excitation voltage is responsive both to generator output load current and to main generator terminal voltage. The latter is, in turn, derived from the rotor-produced synchronous flux (which is dependent upon the rotor field current) diminished by the vectorially subtracted stator leakage reactance drop (which depends on stator current). Within the limitations imposed by "compounding" power drawn from terminal voltage and terminal current separated as they are by a fixed power factor angle, it is possible to construct static excitation systems which exhibit undercompounding, flat compounding, or overcompounding in certain power factor ranges. Typical of such compound static excitation systems are U.S. Pat. No. 2,208,416, Friedländer et al. and U.S. Pat. No. 2,454,582, Thompson et al. It is characteristic of such static systems that linearity in the self-regulating action extends only over a limited range of terminal voltage, terminal current and power factor operation so that the designer seeks to achieve a compounding condition, which comprises the excitation requirements over the entire range of operation with minimum total regulating power.

Various suggestions have been made in the prior art concerning the provision of static sources of excitation power internal to the dynamoelectric machine, such as auxiliary windings in the end turn region (French Pat. No. 1,050,847), or auxiliary windings in the main winding slots (U.S. Pat. No. 3,132,296 to Nippes). An excitation power source providing compounding through internal windings responsive to field flux and to main winding leakage flux is disclosed in U.S. Pat. No. 3,479,543 to K.F. Drexler, assigned to the present assignee. Suggestions have also been made for tapping the main winding of a dynamoelectric machine, as in U.S. Pat. No. 3,035,222 issued to H.B. Stone, in order to obtain a power source for external rectification, such an arrangement being only suitable for relatively small alternators.

It would be desirable to have an excitation system with high response, simple control, compounding which can be adjusted over a wide range to be either self-regulating or supply forced excitation tailored to the instantaneous system requirements, using internal windings, and which would be adaptable to integration with modern gas or liquid cooled generators in a simple, compact, reliable manner.

It is suggested in U.S. Pat. No. 2,839,716 to H. Harz that additional design flexibility can be obtained by using an auxiliary transformer in order to adjust the load-dependent component of the excitation current in phase and magnitude. However, this requires multiple taps on the excitation transformer and requires an additional auxiliary transformer.

Accordingly, one object of the present invention is to provide an internal excitation system in which the phase relationship between the current-responsive component and the voltage-responsive component may be easily selected.

Another object is to provide a widely adjustable internal static, compound excitation power source which enables phase adjustment of the voltage generated in internal windings responsive to the synchronous flux produced by the rotor field winding.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with accompanying drawing in which:

FIG. 1 is a simplified schematic view of a turbine-generator with a new form of static excitation system, and an integrated internal neutral and internal excitation transformer cooled by the dynamoelectric machine cooling system.

FIG. 2 is a fragmentary elevation drawing, partly in section, of the upper end of a dynamoelectric machine illustrating the physical arrangement of components, FIG. 3 is a cross section through the stator slot taken along line III—III of FIG. 2, FIG. 4 is a simplified schematic drawing similar to FIG. 1 but illustrating a modified form of the invention with an external connected neutral, FIG. 5 is a simplified schematic drawing illustrating another modification of the invention with respect to the means of controlling the internal excitation transformer, FIG. 6 is a simplified schematic drawing illustrating another modification, wherein an external, but adjacent excitation transformer utilizes the dynamoelectric machine cooling system, and FIGS. 7a – 7c are vector diagrams for the generator under no load, lagging power factor and leading power factor respectively.

SUMMARY OF THE INVENTION

Briefly stated, the invention is practiced by providing an internal excitation transformer. The transformer has at least two primary windings, one of which is supplied by a supplementary "potential" winding placed in slots selected to produce a substantially voltage-dependent component in a selected phase relationship with a current-dependent component supplied to the other primary winding. The latter is comprised of the internal leads of the wye-connected main winding of the dynamoelectric machine. The secondary or output winding of the excitation transformer supplies a conventional rectifier for providing the field excitation power through conventional slip rings.

DESCRIPTION OF THE PREFERRED EMBODIMENT

Figure 1:
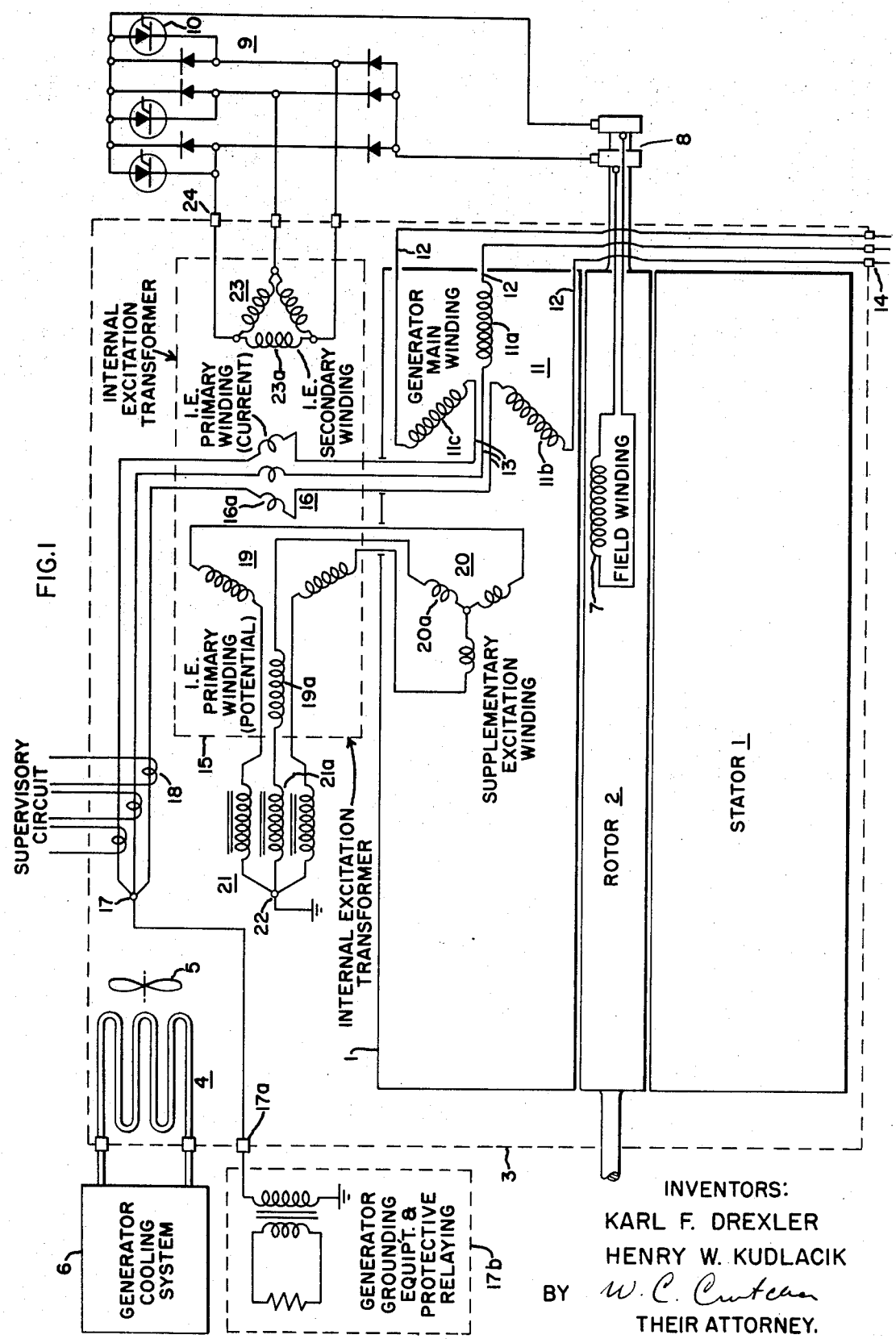

Referring now to FIG. 1 of the drawing, a dynamoelectric machine such as a large turbine-generator is schematically depicted as including a stator 1 and a rotor 2 operating within a sealed enclosure or casing 3. A dynamoelectric machine cooling system is depicted symbolically by cooling coils 4 and recirculating fan 5 inside the casing 3 connected to an external system 6 for rejecting heat outside the casing. The foregoing symbolic representation of the cooling system can take a great many forms well know to those skilled in the art for large dynamoelectric machine such as cooling singly or in combination with a gas, such as hydrogen, recirculated by fans mounted on the rotor, or cooling with liquids such as oil or water recirculated by pumps through tubes among electrical windings or through passages in the windings themselves. Exemplary of such systems is U.S. Pat. No. 2,695,368 issued to C.E. Kilbourne and assigned to the present assignee.

Disposed on the rotor 2 is a field winding 7 supplied through slip ring and brush arrangement 8 from a 3-phase bridge-connected rectifier bank 9. Control of the rectifier voltage is afforded by means of silicon controlled rectifiers 10 connected in shunt across one side of the rectifier bridge output. The rectifier bank 9 and means for controlling it exemplified by silicon controlled rectifiers 10 is typical of conventional or known excitation control circuits. A number of other arrangements suitable for excitation control are suggested in U.S. Pat. No. 3,369,171 issued to L.J. Lane and assigned to the present assignee.

Disposed in slots in the generator stator in a conventional manner is a generator main winding 11 comprising 3-phase windings 11a, 11b, 11c. Each phase set, such as 11a, may in actuality include parallel connected windings, but is illustrated simply as a single winding having a terminal lead 12 and a neutral lead 13.

A conventional arrangement for connecting the generator main winding 11 would be to bring the line leads 12 and the neutral leads 13 out from the casing through bushings and then to connect the neutral leads 13 together to form an external neutral connection and to ground this connection through a high impedance grounding transformer incorporating suitable protective relaying. However, in the present preferred arrangement, only the line leads 12 are brought out of the generator casing 3 through bushings 14. The neutral leads 13, on the other hand, comprise single turn primary windings for an internal excitation transformer indicated schematically by dashed enclosure 15. Although the neutral leads simply make one pass through a laminated core to form a one-turn primary winding, the primary winding is depicted symbolically by coils 16 in FIG. 1 suggesting the primary turns. After passing through the core of the internal excitation transformer 15, the neutral leads 13 are connected together at a common neutral connection point 17 which is located inside the generator casing 3 and ohmically connected through a bushing 17a to externally located grounding and protective relaying equipment 17b of the conventional type. Also, influenced by the neutral leads 13 are the separate current transformers indicated at 18 which are provided for supervisory, protective and instrumentation purposes and have no connection with the present invention.

The internal excitation transformer 15 has a second primary winding 19 which is supplied by a supplementary phase-selectable power source. In FIG. 1 (as well as FIGS. 4, 5 and 6), this takes the form of a supplementary multiphase winding 20 in the stator bore, preferably a liquid cooled winding disposed in the slots of the dynamoelectric machine stator along with the main winding and having only one-half turn for each phase. Each phase conductor such as 20a of the supplementary winding is placed in the proper slot to give the desired phase relationship with respect to a phase winding such as 11a of the main winding. This phase relationship is determined by the slot in which phase winding 20a is placed (cf. FIG. 3, reference number 40). The output from each of the phases such as 20a of the supplementary winding is supplied through a corresponding winding such as 19a of the excitor primary winding 19 and a reactor 21a connected in series therewith to an internal grounded neutral connection 22.

The two primary windings 19a and 16a are operatively disposed on a common core in the excitation transformer 15 so as to generate voltage in a corresponding phase winding 23a of a delta-connected secondary winding 23. The output leads from secondary 23 leave the generator casing via bushings 24 and are connected as the 3-phase input to the rectifier bank 9.

Figure 2:
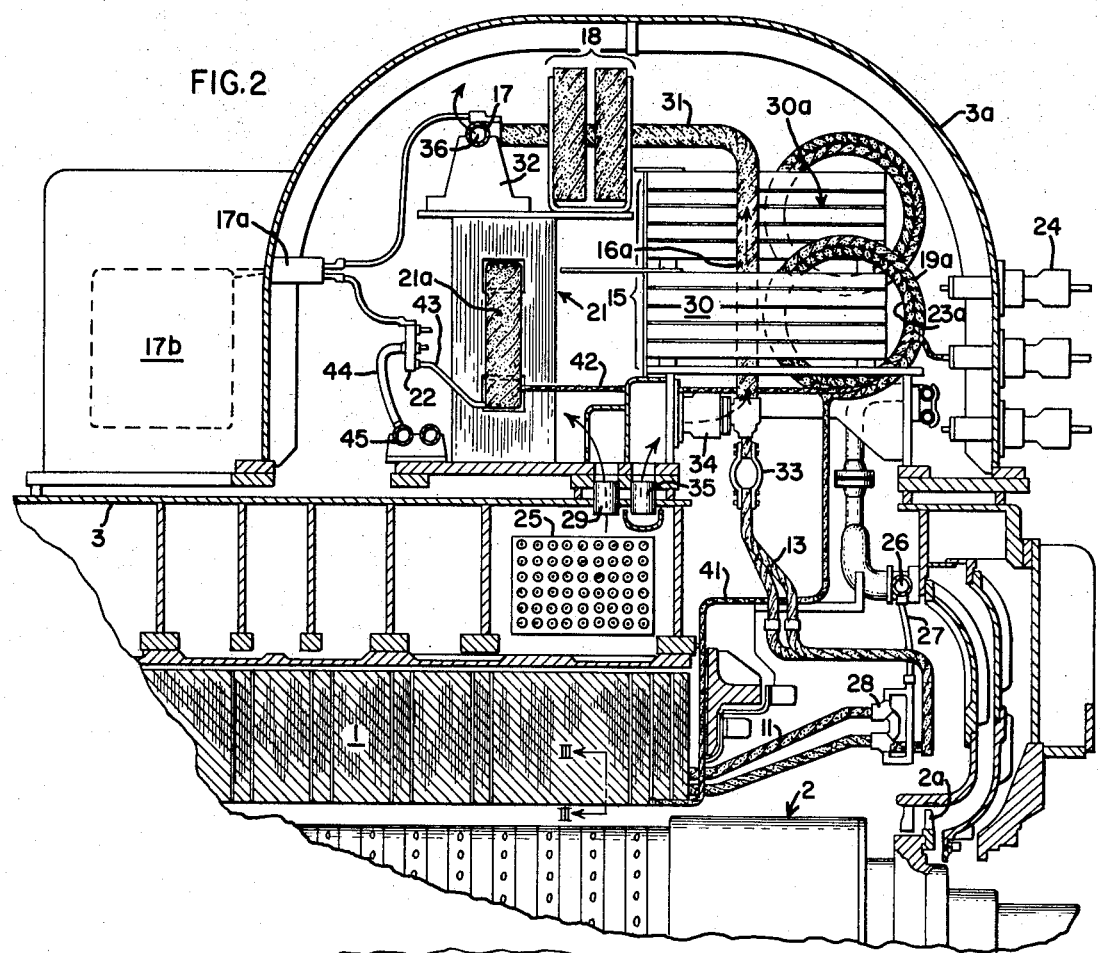

Referring now to FIG. 2 of the drawing, an actual arrangement of elements in a large generator is shown using the same reference numerals where possible to depict identical parts. A cross-sectional view of the upper half at one end of a dynamoelectric machine shows the gastight-casing 3 to contain a laminated stator core 1 with circumferentially disposed slots carrying the main windings 11. A portion of the rotor 2 is shown to carry a fan element 2a forming part of the hydrogen gas cooling system and recirculating gas for the stator 1 and the rotor 2 throughout various passages to then be recooled by suitable heat exchangers such as 25 located inside the casing.

The main winding 11 is also cooled internally by a liquid cooling system, described in more detail in the aforesaid Kilbourne patent, which supplies a liquid such as deionized water from internal headers 26 through insulated hoses 27 to liquid cooled bar terminations 28, and thence through hollow windings to be cooled and recirculated at the other end of the generator. The line leads (not shown) from main winding 11 are brought out of the lower part of the generator through high-voltage bushings.

In accordance with the preferred form of the present invention, the neutral leads 13 are extended into the upper portion of the generator. Casing 3 is enlarged by providing a dome 3a which is adapted by means of suitable conduits 29 to be cooled by gas recirculating over the heat exchanger 25 and recirculating through the dome 3a to cool the components therein. The components include the internal excitation transformer 15, reactors 21 with neutral connection 22 and the main winding neutral connection 17, led through the casing by means of bushing 17a to externally mounted conventional grounding and protective relaying equipment 17b.

The excitation transformer 15 includes three laminated cores such as 30, one for each phase, arranged in a staggered configuration along the top of the dynamoelectric machine inside dome 3a. Each of the cores 30 is arranged to provide flux linkage paths between a pair of primary windings such as 16a and 19a and a secondary winding such as 23a. The primary winding 16a comprises a single turn primary formed by an L-shaped hollow conductor 31 which has a vertical leg passing through the transformer core 30. The upper end of the hollow conductor 31 is connected at the neutral connection 17 with two other similar conductors from the other two phases and held in a bracket 32, after first passing through the supervisory current transformers 18.

The lower end of hollow conductor 31 is electrically connected to one of the neutral ends of the phase windings by means of a flexible electrical connection 33. A hollow insulating sleeve 34 in communication with cold gas supply pipe 35 and also with the interior of conductor 31 provides a flow of cooling gas as shown by the arrows from the heat exchanger 25 through the conductor 31 to an outlet opening 36 at the neutral point. Cooling ducts 30a located between the packages of laminated iron in transformer cores 30 are similarly connected by baffles (not shown) to communicate with cold gas supply pipe 35. Thus, both the exteriors of the cores and windings located in dome 3a, as well as the interior of the neutral lead primary winding and the excitation transformer cores are cooled by the generator cooling gas.

Figure 3:
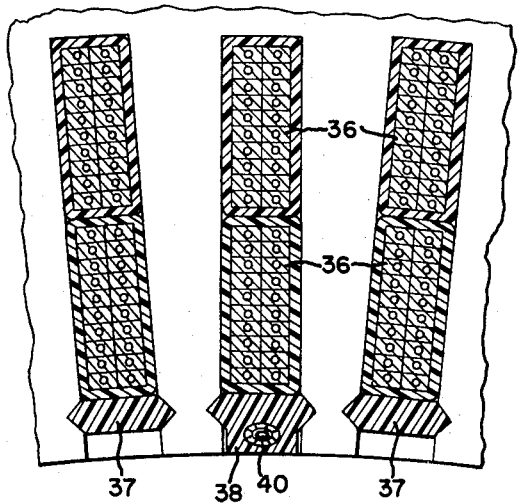

As mentioned previously in connection with FIG. 1, the phase-selectable power source for the other primary winding 19 of the internal excitation transformer is a supplementary winding disposed in the slots of the dynamoelectric machine along with the main winding. Reference to FIG. 3 of the drawing will show a cross section through the dynamoelectric machine slots. The slots contain insulated armature bars 36 held in place by insulated dovetail wedge members 37. At three equally spaced locations around the bore of the armature core, a specially adapted wedge member 38 supports an insulated conductor member 40 composed of hollow ducts and solid strands and extends the length of the generator core and is adapted to link with the synchronous rotor field flux. Conductor 40 thereby forms a one-half turn phase winding represented by phase winding 202 in FIG. 1.

The three conductors 40 are connected together with a suitable neutral connection at one end of the generator stator, whereas at the other end, they are led out of the slot and carried within an insulating sheath, as indicated by reference numeral 41 in FIG. 2 to connect with the primary winding 19a. The other end of primary winding 19a is led via an insulated hollow conductor 42 to the reactor winding 21a and thence via a similar hollow lead 43 to the neutral connection 22. The neutral connection 22 is in the form of a hollow liquid header connected by a hose member 44 to a liquid coolant supply header 45 similar to previously mentioned liquid header 26.

In the manner described above, an electrical series connection is thereby provided from a phase winding 20a (disposed in the top of a stator slot) through excitation primary winding 19a and reactor winding 21a to the neutral connection 22, a similar arrangement being provided for each of the three phases. Also means for liquid cooling the above arrangement includes the hose connection 44 to the series connected windings 21a, 19a, 20a which are in fluid communication with one another.

OPERATION

First, from a standpoint of functioning of the disclosed electrical circuitry, the primary winding 16 of the internal excitation transformer is responsive to current flowing through the neutral leads 13 to and from the internal neutral connection 17. Thus, primary winding 16 represents the current transformer or "CT" of more conventional static excitation systems.

The supplementary winding 20 is responsive to air gap or synchronous flux produced by the rotating field winding 7, and supplies the other primary winding 19 of the internal excitation transformer. Since the rotor synchronous flux generates a "virtual voltage" in the main stator winding which equals the generator terminal voltage if no stator load current is flowing and which differs from the generator terminal voltage by the stator leakage reactance voltage drop if stator current is flowing, the primary winding 19 is therefore somewhat analogous to the potential transformer or "PT" winding of previous static excitation systems. However, it is proportional in magnitude to generator virtual voltage (air gap flux) rather than generator terminal voltage (virtual voltage less leakage reactance drop). This produces the desirable feature of a supplementary winding voltage magnitude greater than terminal voltage in the case of a lagging power factor angle and supplementary winding voltage magnitude less than terminal voltage in the case of a leading power factor.

Another important difference with this system is that, since the supplementary winding 20 can be placed in any desired set of stator slots, the phase displacement of this excitation winding with respect to the main winding can be freely selected to give the optimum compounding relations between the current and potential primary windings on the excitation transformer simply by selecting the proper set of slots. The supplementary winding thus provides another degree of flexibility not achieved with prior art static excitation systems.

The purpose of the reactors is to stabilize operation of the system over an extremely wide range of generator terminal conditions, both steady state an transient.

Primary windings 16, 19 together create flux linking with the secondary windings 23 supplying the rectifier bank 9. Thus a rectified DC field current is supplied to the rotor slip rings 8 which is responsive both to generator current and generator potential in a well-known compounding effect which can be designed to produce an instantaneous excitation forcing action and a steady state self-regulating action which minimizes generator response time and reduces control requirements.

From a standpoint of the physical arrangement, the excitation transformer 15 with windings 16, 19, 23 is physically smaller than prior excitation transformers by virtue of being effectively cooled by the generator cooling systems, both gas and liquid in the present embodiment. Since it is much smaller in size than conventional external excitation transformers, it becomes practical to locate the excitation transformer internally so that it thereby becomes practical to use the generator cooling system and to integrate into the structure of the internal generator neutral leads. Thus a synergistic effect is achieved by locating the internal excitation transformer within or in close proximity to the generator casing so as to utilize the generator cooling system.

By connecting the neutral ends of the phases internally rather than carrying them out through neutral bushings, a very compact and convenient arrangement is achieved. The location of the neutral connections at the top of the generator while the line ends of the phases are brought out at the bottom makes it physically very simple to run the neutral leads through the internal excitation transformer cores providing one-turn primaries. At the same time this provides the maximum in accessability for installation or servicing of the excitation transformers (by removing dome 3a), and frees space at bottom of the generator so that the isolated phase bus connections can be made in the easiest possible way. By locating the generator grounding transformer protective relaying equipment 17b outside the generator casing but in close proximity to the neutral point, the maximum in accessibility, protection, and conventional practice in these latter elements is achieved.

Dielectric requirements and duty on this static excitation arrangement are minimized because the excitation transformer couples the neutral end of the generator phase windings rather than the line ends of the phases, and because the potential winding is electrically isolated from the main windings.

MODIFIED FORMS OF THE INVENTION (FIGS. 4-6)

Figure 4:
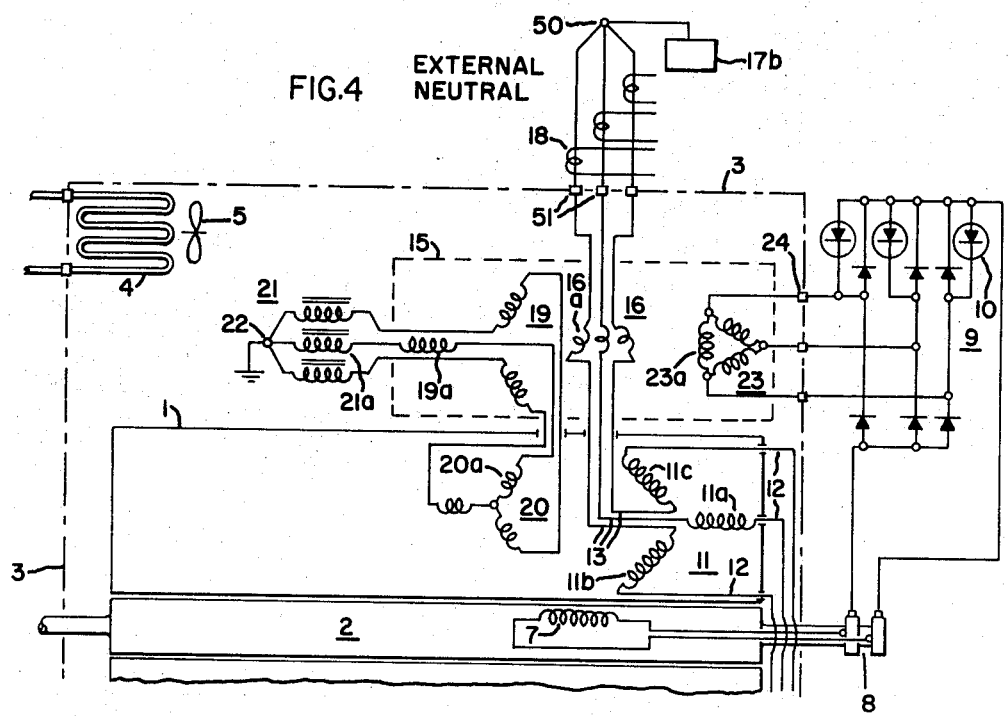

Several modified forms of the invention are illustrated in FIGS. 4 through 7. Although the preferred form of the invention employs an internal neutral connection, FIG. 4 shows an arrangement wherein the neutral connection 50 is made outside of the generator casing after the neutral leads 13 have been brought out through the casing 3 via bushings 51, first having been brought through the excitation transformer 15. In this arrangement, the supervisory current transformers 18 are also more conveniently located outside of the casing to be accessible for servicing.

Figure 5:
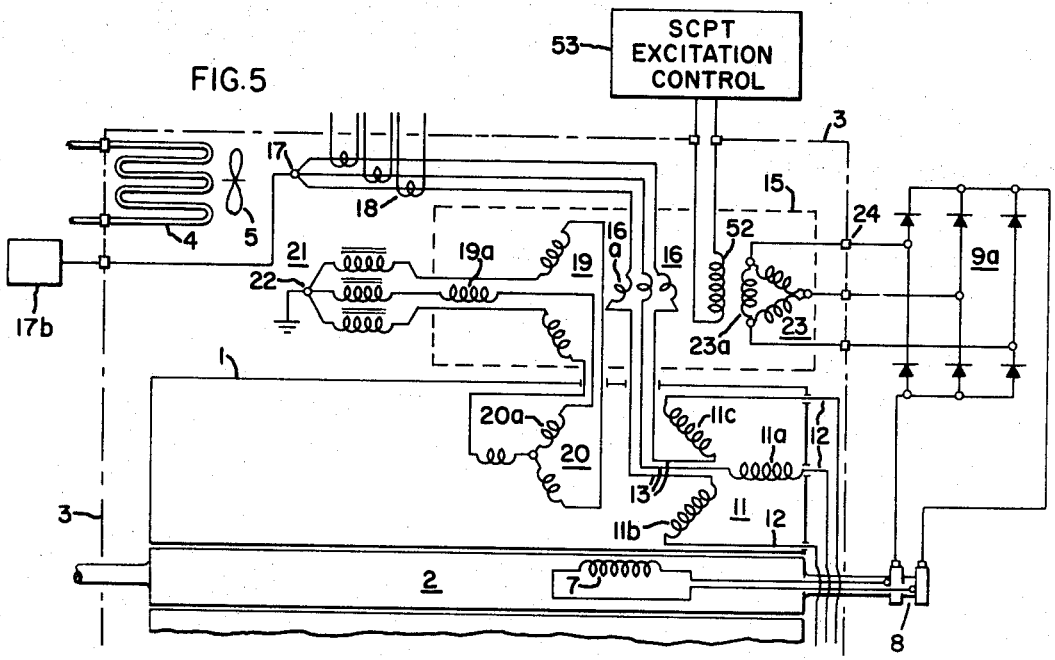

In FIG. 5, a slightly different control scheme is employed for the internal excitation transformer. The silicon controlled rectifiers 10 of FIG. 1 are eliminated and in their place, an additional control winding 52 is added to the internal excitation transformer core. A conventional voltage regulator 53 provides a regulated DC voltage which is applied to the control winding 52. Winding 52 is arranged with respect to the other windings so as to enable saturation of the internal excitation transformer cores and thereby control the output from the secondary winding 23 to a 3-phase diode bridge rectifier bank 9a.

The operation of the foregoing modified form of the invention in FIG. 5 is similar to that of a conventional saturable current-potential transformer or "SCPT" with the important difference that it is more flexible with respect to selection of phase displacement of the supplementary winding in the slots and also it has a higher response due to the construction and small size of the internal excitation transformer.

Figure 6:
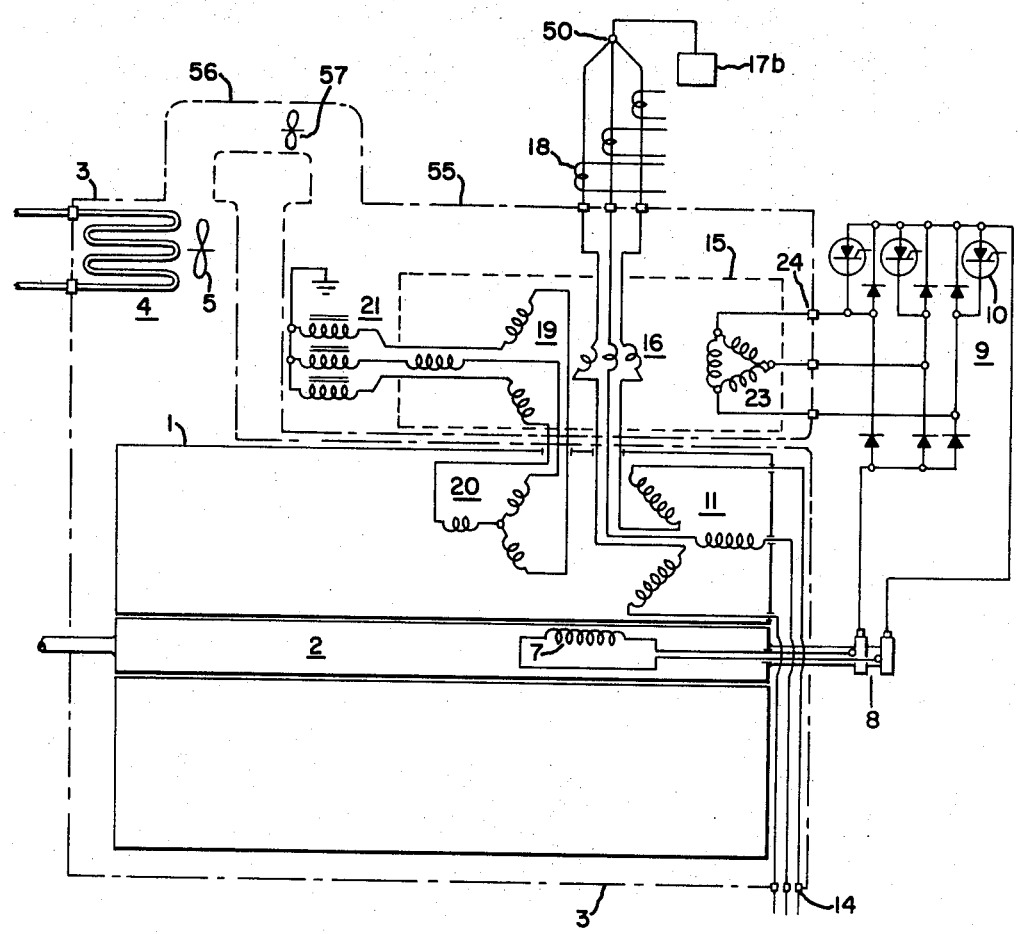

FIG. 6 is another modification of the invention, representing a slightly different physical arrangement of the generator. The generator casing 3 is modified by enclosing the excitation transformer 15 and the reactors 21 in a sealed enclosure 55 which is separate from but physically closely adjacent to the generator casing 3. Cooling of the enclosure 55 is provided by means of the generator cooling system via communicating conduits symbolically indicated at 56 and a recirculating arrangement symbolically shown at 57. The neutral connection 50 is made outside of the generator casing as indicated previously in connection with the FIG. 4 embodiment.

The physical significance of providing an enclosure which is separate, but located close enough to utilize the dynamoelectric machine cooling system can be appreciated by review of the physical arrangement in FIG. 2. There the supplementary dome 3a would be replaced by a separate casing which may yet be located in approximately the same position on top of the generator. Therefore, the generator design would not be so closely dependent upon the design of the internal excitation transformer and other components with the exception of the interconnected cooling passages. Similarly, the enclosure 55 can be located directly beneath the dynamoelectric machine but closely adjacent thereto.

Figure 7A:
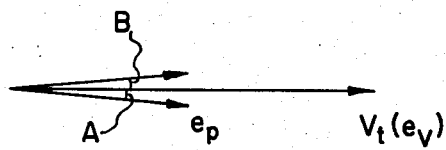
Figure 7B:
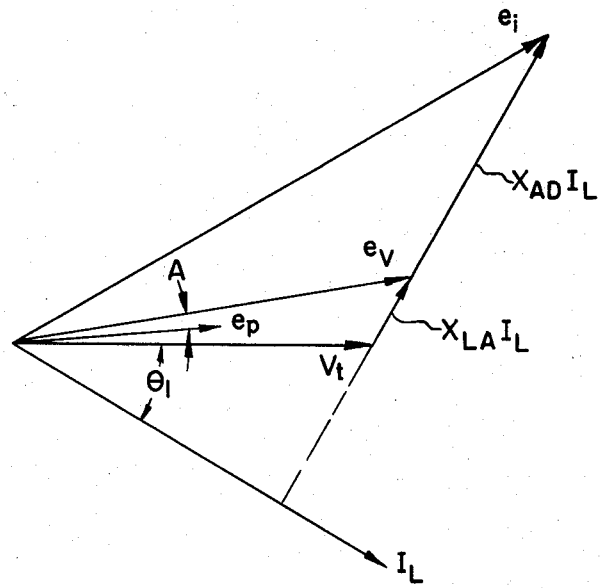
Figure 7C:
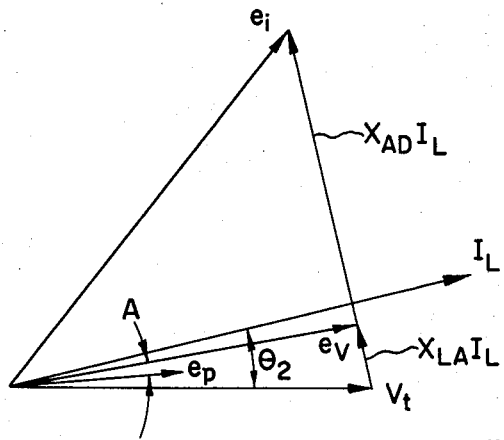

FIGS. 7a, 7b and 7c are vector diagrams for the generator under no load condition, lagging power factor, and leading power factor respectively. $V_t$ is the external neutral to line voltage while $I_L$ is the line current under load. In FIG. 7a there is no load current flowing, while in FIG. 7b the load current $I_L$ lags the terminal voltage $V_t$ by power factor angle $\theta_1$, here about 30°. In FIG. 7c, $I_L$ leads $V_t$ by a power factor angle $\theta_2$ of about 15°.

Leading the line current $I_L$ by 90° in both FIGS. 7b and 7c is a voltage drop $X_{LA} I_L$ due to armature leakage reactance which added vectorially to the terminal voltage $V_t$ gives voltage vector $e_v$. Voltage $e_v$, sometimes called "virtual voltage", is that which is produced in the armature winding by the air gap synchronous flux under load. Since the supplementary winding is placed in a slot, it is proportional in magnitude to virtual voltage.

Another voltage drop $X_{AD} I_L$ is due to armature winding reaction and when added vectorially to $e_v$ gives $e_t$ which (when saturation is neglected) is proportional to the excitation voltage necessary to be applied to the field to produce terminal voltage $V_t$ at load current $I_L$. Conventional compound excitation systems attempt to provide an excitation source with voltage and current responsive components so as to derive a vector triangle similar to that bounded by vectors $V_t$, $e_t$.

The present system differs, in that the supplementary winding voltage is proportional in magnitude to virtual voltage $e_v$ and therefore is affected to some extent by current due to the voltage drop $X_{LA} I_L$. Also, the selection of the slot or slots in which the supplementary winding is placed will permit shifting the phase of the voltage generated in the supplementary winding from the virtual voltage. This phase shift will hold constant with respect to virtual voltage $e_v$ under all load conditions whether leading or lagging power factor.

Reference to FIG. 7a illustrates that by placing the supplementary winding in slots to one side or the other of the centerline of the main armature winding, considered at no load conditions, the voltage $e_p$ generated in the supplementary winding will be offset in phase by angle A or B to either side of the virtual voltage vector $e_v$ (coincident with terminal voltage).

Assuming that angle A is selected and the generator is now loaded as in FIG. 7b, the supplementary winding voltage $e_p$ remains at the same phase offset angle A with respect to virtual voltage $e_v$. Similarly, in FIG. 7c, voltage $e_p$ is shifted in phase at the same angle A with respect to a smaller value of $e_v$. In all cases, of course, the magnitude of $e_P$ is proportional to $e_V$.

Consideration of the vector diagrams shows first that a supplementary winding with no phase offset will generate a relatively greater magnitude voltage component at lagging power factor and a relatively smaller voltage component at leading power factor than conventional compound systems whose voltage components are produced by terminal voltage $V_T$. Secondly, by introducing a phase shift such as a, the excitation versus power factor curve for a particular generator may be tailored to produce a desired margin between required excitation voltage and excitation voltage actually available over the entire range of power factor angles. Thus optimum compounding is achievable by proper selection of the slots in which the supplementary winding is placed so that the supplementary winding becomes a phase-selectable power source to the primary winding 19 of the internal excitation transformer.

ADVANTAGES

The foregoing arrangements, first of all, have the advantages inherent in all static excitation systems in that the normal rotating equipment associated with the separate exciter is eliminated and the end of the generator is free except for the slip rings. Considerable floor space is saved and separate foundations are eliminated by location of the excitation transformers internally. Maximum freedom for the generator isolated phase bus is obtained by locating the generator neutrals and excitation equipment on top of the generator. This provides maximum accessability and permits the stator frame to be strengthened in its end sections. High response of excitation is provided due to the inherent self-regulating action and the laminated low-time-constant magnetic structure of the internal excitation transformers. An optimum combination of excitation forcing action during system transients and steady state self-regulating action over an extremely wide range of generator operating conditions can be obtained with minimum control power because of the greater flexibility available in selecting compounding relationships with this system. Location of the excitation transformer inside the generator casing and employing the neutral leads of the main windings avoids the necessity for breaking into the isolated phase bus on the high voltage end of the main windings. Use of the generator coolants greatly reduces the size of the excitation transformer opposed to conventional external transformers, and this in turn favors placement of the transformer inside the generator casing. Thus there has been disclosed above a greatly improved static excitation system for large internally cooled dynamoelectric machines.

While there is shown what is considered at present to be the preferred embodiment of the invention, it is of course understood that various other modifications may be made therein. For example, the neutral connections could be arranged in an enlarged terminal box below the generator adjacent to the high voltage bushings. It is intended to cover in the appended claims all such modifications as fall within the true spirit and scope of the invention.

What is claimed is:

1. In a static excitation system for a dynamoelectric machine having a rotating field winding, an electromagnetic stator core and a multiphase set of main armature windings, each main winding having an internal line lead and an internal neutral lead, the combination of:
   an internal excitation transformer having a core, at least two primary windings and a secondary winding,
   one of said primary windings being comprised of selected internal leads from said main winding of the dynamoelectric machine, and
   a supplementary multiphase winding substantially responsive to synchronous flux provided by said dynamoelectric machine rotating field winding, said supplementary winding being connected to the other primary winding of said excitation transformer.

2. The combination according to claim 1, further including stationary rectifier means connected to the secondary winding of said excitation transformer and output leads connected to supply excitation power from the rectifier means to said rotating field winding.

3. The combination according to claim 1 wherein said supplementary winding is disposed in stator core slots selected to cause the voltage generated in said supplementary winding to be substantially in phase with the virtual voltage produced by said synchronous flux.

4. The combination according to claim 1 wherein said supplementary winding is disposed in stator core slots selected to cause the voltage generated in said supplementary winding to be shifted in phase so as to lead by a selected phase angle the virtual voltage produced by said synchronous flux.

5. The combination according to claim 1 wherein said supplementary winding is disposed in stator core slots selected to cause the voltage generated in said supplementary winding to be shifted in phase so as to lag by a selected phase angle the virtual voltage produced by said synchronous flux.

6. The combination according to claim 1, further including a reactor winding connected in series with each phase winding of said supplementary winding and the corresponding connected phase winding of said excitation primary winding.

7. The combination according to claim 1, wherein at least one control winding is provided for said excitation transformer and a regulated DC voltage source is connected thereto, said control winding being adapted through said voltage source to saturate the excitation transformer and thereby control the output from said secondary winding.

* * * * *